United States Patent
Ozawa et al.

(10) Patent No.: US 7,531,585 B2
(45) Date of Patent: May 12, 2009

(54) POLYACTIC ACID RESIN COMPOSITION

(75) Inventors: Masaaki Ozawa, Toyama (JP); Yasuo Kawamura, Funabashi (JP); Yoshie Kawamura, legal representative, Funabashi (JP); Ryoko Kawamura, legal representative, Funabashi (JP); Daichi Kawamura, legal representative, Funabashi (JP); Mikio Kasai, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 288 days.

(21) Appl. No.: 10/593,626

(22) PCT Filed: Mar. 25, 2005

(86) PCT No.: PCT/JP2005/005573

§ 371 (c)(1), (2), (4) Date: Sep. 21, 2006

(87) PCT Pub. No.: WO2005/097894

PCT Pub. Date: Oct. 20, 2005

(65) Prior Publication Data

US 2007/0299170 A1 Dec. 27, 2007

(30) Foreign Application Priority Data

Mar. 30, 2004 (JP) .............................. 2004-097361

(51) Int. Cl.
*C08K 5/5313* (2006.01)
*C08K 5/5317* (2006.01)

(52) U.S. Cl. ...................... 524/132; 524/135

(58) Field of Classification Search ................ 524/132, 524/135
See application file for complete search history.

(56) References Cited

U.S. PATENT DOCUMENTS

| | | | | |
|---|---|---|---|---|
| 5,138,022 | A | * | 8/1992 | Mang et al. ................ 528/272 |
| 6,620,869 | B2 | * | 9/2003 | Asrar et al. ................ 524/133 |
| 7,205,352 | B2 | * | 4/2007 | Weipert et al. ............. 524/317 |
| 7,268,190 | B2 | * | 9/2007 | Ohme et al. ................ 525/400 |
| 2002/0031665 | A1 | * | 3/2002 | Audenaert et al. .......... 428/375 |

2005/0001358 A1 1/2005 Nakazawa et al.

FOREIGN PATENT DOCUMENTS

| | | |
|---|---|---|
| JP | A 58-108249 | 6/1983 |
| JP | A 8-3432 | 1/1996 |
| JP | A 08-003432 | 1/1996 |
| JP | A 10-087975 | 4/1998 |
| JP | A 10-87975 | 4/1998 |
| JP | A 10-158369 | 6/1998 |
| JP | A 10-259083 | 9/1998 |
| JP | A 2003-192883 | 7/2003 |
| JP | A 2003-192929 | 7/2003 |
| WO | WO 99/05207 A1 | 2/1999 |

\* cited by examiner

*Primary Examiner*—Peter Szekely
(74) *Attorney, Agent, or Firm*—Oliff & Berridge, PLC.

(57) ABSTRACT

It is an object of the present invention is to provide a polylactic acid resin composition in which a crystal nucleator appropriate for accelerating crystallization of polylactic acid rein is added.

A polylactic acid resin composition comprising a polylactic acid resin, and a metal salt of a phosphorus compound of formula (I)

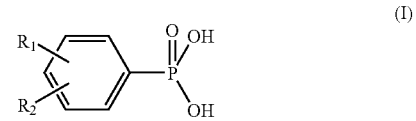

(I)

wherein $R_1$ and $R_2$ may be the same or different and are hydrogen atom, $C_{1-10}$alkyl or $C_{2-10}$alkoxycarbonyl, or a polylactic acid resin composition comprising a polylactic acid resin, and a metal salt of a phosphorus compound of formula (II)

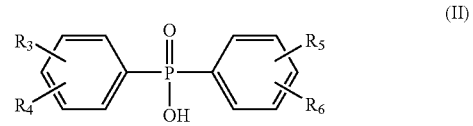

(II)

wherein $R_3$, $R_4$, $R_5$ and $R_6$ may be the same or different and are hydrogen atom, $C_{1-10}$alkyl or $C_{2-10}$alkoxycarbonyl. The composition is excellent in heat resistance and forming processability.

12 Claims, 2 Drawing Sheets

POLYACTIC ACID RESIN COMPOSITION

TECHNICAL FIELD

The present invention relates to a polylactic acid resin composition. More specifically, the present invention relates to a polylactic acid resin composition that has a high crystallization rate and is excellent in heat resistance and forming processability.

BACKGROUND ART

From the viewpoint of the conservation of natural environment, researches on aliphatic polyesters biodegradable in natural environment have been eagerly undertaken. Among them, polylactic acid is expected as molding materials, for example for packaging materials such as container, film or the like, fabric materials such as clothing, floor mat, interior material for automobile or the like, covers or parts of electric or electronic products, and the like, as it has a high melting point of 160 to 180° C., and is excellent in transparency. However, polylactic acid has a low crystallization rate, thus particularly in case where it is produced by injection molding in which orientation is not carried out, there are problems that the molded products are liable to have a low degree of crystallinity and deform at a temperature over glass transition temperature of about 60° C. In order to improve the degree of crystallinity, a process in which the mold temperature on injection molding is increased and the cooling time in the mold is elongated is attempted, but the process has a problem in productivity as a molding cycle is elongated. In order to produce polylactic acid resin compositions in a high productivity and use it for broad purpose, it is tried to increase crystallization rate and degree of crystallinity and improve forming processability and heat resistance.

As a method for increasing the crystallization rate of polylactic acid resin, for example a process in which a crystal nucleator is added is known. The crystal nucleator accelerates crystal growth by becoming a primary crystal nucleus of crystalline polymer and lower the crystal size, and improves the crystallization rate at the same time. The disclosed crystal nucleators for polylactic acid resins include inorganic particles composed of talc and/or boron nitride having a particle diameter of a specific level or less (see, Patent Document 1), amide compounds of a specific formula (see, Patent Document 2), sorbitol derivatives of specific formula (see, Patent Document 3), phosphoric acid ester metal salts and/or basic inorganic aluminum compounds (see, Patent Document 4), and the like. These methods can improve the crystallization rate and the degree of crystallinity. However, in recent years, for the accomplishment of higher forming processability and heat resistance, it is desired to develop further effective crystal nucleators. In addition, it is known that metal salts of phosphonic acid, phosphonous acid or the like are effective as a crystal nucleator for block copolymeric poly(ether ester) (see, Patent Document 5).

Patent Document 1: JP-A-8-3432 (1996) (Claims)
Patent Document 2: JP-A-10-87975 (1998) (Claims)
Patent Document 3: JP-A-10-158369 (1998) (Claims)
Patent Document 4: JP-A-2003-192883 (2003) (Claims)
Patent Document 5: JP-A-58-108249 (1983) (Claims)

DISCLOSURE OF INVENTION

Problem to be Solved by the Invention

As mentioned above, it is desired to develop crystal nucleators effective for improving forming processability and heat resistance for the production of polylactic acid resin compositions in a high productivity and the utilization for broad purpose. Therefore, an object of the present invention is to provide a polylactic acid resin composition in which a crystal nucleator appropriate for accelerating crystallization of polylactic acid rein is added.

Means for Solving the Problem

The object of the present invention is accomplished by the following means. A first aspect of the present invention is a polylactic acid resin composition comprising a polylactic acid resin, and a metal salt of a phosphorus compound of formula (I)

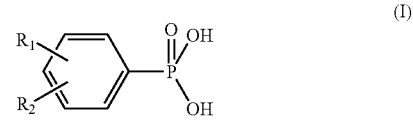

wherein $R_1$ and $R_2$ may be the same or different and are hydrogen atom, $C_{1-10}$alkyl or $C_{2-10}$alkoxycarbonyl.

Now, preferred embodiments of the first aspect are as follows.

- the metal salt is one or more selected from the group consisting of lithium salt, sodium salt, potassium salt, calcium salt, magnesium salt and zinc salt;
- the metal salt of the phosphorus compound of formula (I) is contained in an amount of 0.01 to 10.0 mass parts based on 100 mass parts of the polylactic acid resin; and
- the average particle diameter of the metal salt is 0.05 to 10 μm, preferably 0.05 to 5 μm.

A second aspect of the present invention is a polylactic acid resin composition comprising a polylactic acid resin, and a metal salt of a phosphorus compound of formula (II)

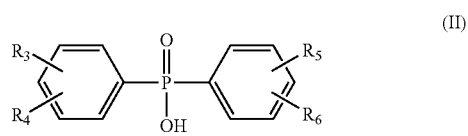

wherein $R_3$, $R_4$, $R_5$ and $R_6$ may be the same or different and are hydrogen atom, $C_{1-10}$alkyl or $C_{2-10}$alkoxycarbonyl.

Now, preferred embodiments of the second aspect are as follows.

- the metal salt is one or more selected from the group consisting of lithium salt, sodium salt, potassium salt, calcium salt, magnesium salt and zinc salt;
- the metal salt of the phosphorus compound of formula (II) is contained in an amount of 0.01 to 10.0 mass parts based on 100 mass parts of the polylactic acid resin; and
- the average particle diameter of the metal salt is 0.05 to 10 μm, preferably 0.05 to 5 μm.

EFFECT OF THE INVENTION

The addition of the metal salt of specific phosphorus compound as a crystal nucleator in a polylactic acid resin makes possible to improve the crystallization rate of the polylactic acid resin and to provide a polylactic acid resin composition excellent in heat resistance and forming processability.

BEST MODE FOR CARRYING OUT THE INVENTION

The polylactic acid resin in the present invention includes homopolymers or copolymers of polylactic acid. In addition, it may be blend polymers comprising homopolymers or copolymers of polylactic acid as a main component with other resins. The other resins include biodegradable resins other than polylactic acid, universally applicable synthetic resins, universally applicable synthetic engineering plastics, and the like. In case where the polylactic acid resin is a copolymer, the arrangement style of the copolymer may be that in random copolymer, alternating copolymer, block copolymer or graft copolymer.

The polylactic acid is not specifically limited, and includes for example one obtained by subjecting lactide to ring opening polymerization, or one obtained by directly subjecting D-form, L-form, racemate or the like of lactic acid to polycondensation. The number average molecular weight of polylactic acid is generally about 10,000 to 500,000. Also, polylactic acid resins crosslinked with a crosslinking agent by use of heat, light, radiation or the like can be used.

The substituents shown by $R_1$ and $R_2$ in formula (I) in the phosphorus compound of the formula of the present invention include hydrogen atom, $C_{1-10}$alkyl such as methyl, ethyl, n-propyl, i-propyl, n-butyl, i-butyl, t-butyl or the like, $C_{2-10}$alkoxycarbonyl such as methoxycarbonyl, ethoxycarbonyl or the like. These substituents may be the same or different. Concrete examples are phenyl phosphonic acid, 4-methylphenyl phosphonic acid, 4-ethylphenyl phosphonic acid, 4-n-propylphenyl phosphonic acid, 4-i-propylphenyl phosphonic acid, 4-n-butylphenyl phosphonic acid, 4-i-butylphenyl phosphonic acid, 4-t-butylphenyl phosphonic acid, 3,5-dimethoxycarbonylphenyl phosphonic acid, 3,5-diethoxycarbonylphenyl phosphonic acid, 2,5-dimethoxycarbonylphenyl phosphonic acid, 2,5-diethoxycarbonylphenyl phosphonic acid, or the like.

The substituents shown by $R_3$, $R_4$, $R_5$ and $R_6$ in formula (II) in the phosphorus compound of the formula of the present invention include hydrogen atom, $C_{1-10}$alkyl such as methyl, ethyl, n-propyl, i-propyl, n-butyl, i-butyl, t-butyl or the like, $C_{2-10}$alkoxycarbonyl such as methoxycarbonyl, ethoxycarbonyl or the like. These substituents may be the same or different. Concrete examples are diphenyl phosphinic acid, di-4-methylphenyl phosphinic acid, di-4-ethylphenyl phosphinic acid, di-4-t-butylphenyl phosphinic acid, di-3,5-dimethoxycarbonylphenyl phosphinic acid, di-3,5-diethoxycarbonylphenyl phosphinic acid, or the like.

For the metal salts of the phosphorus compound of formula (I) or (II) of the present invention, mono-, di- and tri-valent metals can be used. Two or more metals together can be used in these metal salts. Concrete examples of the metals include lithium, sodium, magnesium, aluminum, potassium, calcium, barium, copper, zinc, cobalt, nickel, or the like.

The molar ratio between phosphorus compound of formula (I) or (II) and metal is not specifically limited and generally the molar ratio of phosphorus compound/metal preferably ranges from 1/2 to 2/1. In addition, it is preferable that the salt compound contains no free phosphorus compound or metal that does not form salt.

The process for producing the metal salts of the phosphorus compound of formula (I) or (II) is not specifically limited, and generally the metal salts can be obtained by mixing a phosphorus compound and an oxide, a hydroxide or an organic acid salt of a metal in water or an organic solvent, and reacting them, then filtering off or distilling off water or the organic solvent, and drying as a crystalline powder. Also, the metal salts can be obtained by mixing a phosphorus compound, a chloride of a metal and sodium hydroxide in water, and reacting them to make a metal salt of the phosphorus compound precipitate, then filtering and drying. When these compounds are commercially available, the commercially available ones can be used.

The added amount of the metal salt of the phosphorus compound of formula (I) or (II) is 0.01 to 10.0 mass parts, preferably 0.02 to 5.0 mass parts, further preferably 0.03 to 2.0 mass parts based on 100 mass parts of polylactic acid resin. When the added amount is less than 0.01 mass part, it becomes difficult to fully improve the crystallization rate of polylactic acid resin. On the other hand, even when the added amount is more than 10 mass parts, the crystallization rate is not further improved.

The average particle diameter of the metal salt of the phosphorus compound of formula (I) or (II) is preferably 10 μm or less, more preferably 5 μm or less. In this specification, the average particle diameter (μm) is 50% volume diameter (median diameter) determined by measuring by laser diffraction and scattering method based on Mie Theory. The smaller the average particle diameter is, the better it is as the crystallization rate tends to be improved.

In order to obtain the metal salt of the phosphorus compound of formula (I) or (II) having an average particle diameter of 10 μm or less, the crystalline powder obtained according to the above-mentioned method can be subjected to a process with a mixing machine having shear force, such as a homomixer, Henschel mixer, Loedige mixer or the like, or a dry-type mill, such as a ball mill, a pindisc mill, a pulverizer, Inomizer, a counterjet mill or the like to obtain a fine powder, if necessary. Also, the crystalline powder can be subjected to a process with a wet-type mill such as a ball mill, a bead mill, a sand grinder, an attritor or the like by use of water, an organic solvent that can be mixed with water and a mixed solution thereof to obtain a fine powder. The lower limit of size of milled powder is 0.05 μm. Therefore, the average particle diameter of the metal salt of the phosphorus compound of formula (I) or (II) is preferably 0.05 to 10 μm, more preferably 0.05 to 5 μm.

In the present invention, the method for adding the metal salt of the phosphorus compound of formula (I) or (II) in the polylactic acid resin in not specifically limited, and can be carried out by any known methods. For example, the polylactic acid resin and each component may be individually mixed in several mixers, and kneaded with a single- or double-screw extruder, or the like. The kneading is generally carried out at a temperature of about 150 to 220° C. Also, another process can be carried out in which a master batch containing each component in a high concentration is produced and added in the polylactic acid resin. Further, the metal salt of the phosphorus compound of formula (I) or (II) can be added in the polymerization step of the polylactic acid resin.

The polylactic acid resin composition of the present invention may contain any known inorganic fillers. The inorganic fillers include for example glass fiber, carbon fiber, talc, silica, kaolin, clay, wollastonite, glass bead, glass flake, potassium titanate, calcium carbonate, magnesium sulfate, titanium oxide or the like. The form of these inorganic fillers may be fibrous, granular, plate-like, needle-like, spherical or powdery. The inorganic filler can be used in an amount of 300 mass parts or less based on 100 mass parts of the polylactic acid resin.

The polylactic acid resin composition of the present invention may contain any known flame retardants. The flame retardants include for example halogen-type flame retardants such as bromine- or chlorine-type flame retardants, etc., antimony-type flame retardants such as antimony trioxide, antimony pentaoxide or the like, inorganic flame retardants such as aluminum hydroxide or magnesium hydroxide, silicone-type compounds, etc., phosphorus-type flame retardants such as red phosphorus, phosphoric acid esters, ammonium polyphosphate, phosphazene or the like, melamine-type flame retardants such as melamine, melam, melem, melon, melamine cyanurate, melamine phosphate, melamine pyrophosphate, melamine polyphosphate, melamine melam melem polyphosphate double salt, melamine alkylphosphonate, melamine phenylphosphonate, melamine sulfate, melam methanesulfonate or the like, fluororesin such as PTFE or the like. The flame retardant can be used in an amount of 200 mass parts or less based on 100 mass parts of the polylactic acid resin.

In addition to the above-mentioned components, there can be used together several additives that are generally used in the production of general synthetic resins, for example heat stabilizers, light stabilizers, ultraviolet light absorbers, antioxidants, impact improvers, antistatic agents, pigments, colorants, die lubricants, lubricants, plasticizers, compatibilizing agents, blowing agents, perfumes, anti-bacterial and anti-fungus agents, several coupling agents such as silane-type, titanium-type, aluminum-type coupling agents, etc., and other crystal nucleators, and the like. When the polylactic acid resin composition of the present invention is used for molding, several molded products can be easily produced by use of common molding process such as injection molding, blow molding, vacuum molding, compression molding or the like.

EXAMPLES

Hereinafter, the present invention is described in more detail according to examples and comparative examples.

Synthetic Example 1

Synthesis of magnesium phenylphosphonate 1.58 g (10.0 mmol) of phenylphosphonic acid (manufactured by Nissan Chemical industries, Ltd.), 0.583 g (10.0 mmol) of magnesium hydroxide and 41 g of water were mixed, stirred at 80° C. for 3 hours, then water was distilled off under reduced pressure and dried at 200° C. to obtain 1.78 g (yield 99%) of the aimed product as white crystal. Decomposition temperature: 524° C.

Synthetic Example 2

Synthesis of Sodium phenylphosphonate

In 1.58 g (10.0 mmol) of phenylphosphonic acid (manufactured by Nissan Chemical industries, Ltd.), 20 mL (10.0 mmol) of 0.5 N sodium hydroxide was added, stirred at room temperature for 10 minutes, then water was distilled off under reduced pressure and dried to obtain 1.78 g (yield 99%) of the aimed product as white crystal. Decomposition temperature: 480° C.

Synthetic Example 3

Synthesis of zinc phenylphosphonate 1.58 g (10.0 mmol) of phenylphosphonic acid (manufactured by Nissan Chemical industries, Ltd.), 2.20 g (10.0 mmol) of zinc acetate dihydrate and 72 g of water were mixed, stirred at 80° C. for 3 hours, then the resulting slurry was filtered, acetic acid in the wet cake was fully washed away with water, and thereafter, dried at 150° C. to obtain 2.17 g (yield 98%) of the aimed product as white crystal. Decomposition temperature: 541° C. The average particle diameter was 4.4 μm with a laser diffraction type particle size distribution meter (manufactured by Seishin Enterprise Co., Ltd., PRO-7000S).

Synthetic Example 4

Synthesis of disodium 4-t-butylphenylphosphonate

In a flask, 50.0 g (234 mmol) of 1-bromo-4-t-butylbenzene (manufactured by Tokyo Kasei Kogyo Co., Ltd., product number B1727), 77.6 g (468 mmol) of triethyl phosphonate and 3.3 g (19 mmol) of palladium chloride were placed, and the reaction solution was refluxed at 150° C. After 7 hours, heating was stopped, cooled to room temperature, then extracted with 1,2-dichloroethane, thereafter the extract was washed with water, the organic phase was concentrated to obtain crude diethyl 4-t-butylphenyl phosphonate.

Next, 220 g (2.1 mol) of concentrated hydrochloric acid was added in the obtained crude diethyl 4-t-butylphenyl phosphonate mixture, and heated at 110° C. After 12 hours, heating was stopped, cooled to room temperature. The reaction mixture was dissolved in ethanol, filtered, thereby palladium compounds were removed. The filtrate was concentrated as such and dried under vacuum to obtain 18.7 g of 4-t-butylphenyl phosphonic acid being the aimed compound (melting point 193-194° C., white solid, yield 37% (yield from 1-bromo-4-t-butylbenzene).

8.50 g (39.7 mmol) of the obtained 4-t-butylphenyl phosphonic acid was added and dissolved in a mixed solution of 150 mL of water and 50 mL of methanol. In the resulting solution, an aqueous solution of 3.18 g (79.4 mmol) of sodium hydroxide in 50 mL of water was added dropwise, and stirred at room temperature for 2 hours. Thereafter the solvent was distilled off under reduced pressure and dried to obtain 10.3 g (yield 100%) of the aimed product as white crystal. Decomposition temperature: 484° C.

Synthetic Example 5

Synthesis of sodium diphenylphosphinate

In 2.18 g (10.0 mmol) of diphenylphosphinic acid (manufactured by Aldrich Inc., Product No. 10, 852-9), 20 mL (10.0 mmol) of 0.5 N sodium hydroxide was added, stirred at room temperature for 10 minutes, then water was distilled off under reduced pressure. The obtained solid was washed with a small amount of methanol and dried to obtain 2.35 g (yield 98%) of the aimed product as white crystal. Decomposition temperature: 469° C.

Synthetic Example 6

Synthesis of zinc phenylphosphonate

In a glass ball mill container having a volume of 900 mL, 1000 g of 1 mmφ zirconia beads were charged, further 17.0 g (108 mmol) of phenylphosphonic acid (manufactured by Nissan Chemical industries, Ltd.), 8.78 g (108 mmol) of zinc oxide and 231 g of water were mixed, stirred at 170 rpm for 20 hours at room temperature. Then the slurry was separated from zirconia beads, and the separated slurry was filtered, and the wet cake was fully washed with water. Thereafter, the slurry was dried at 150° C. to obtain 23.4 g (yield 98%) of the aimed product as white crystal. The average particle diameter was 1.1 μm with a laser diffraction type particle size distribution meter (manufactured by Seishin Enterprise Co., Ltd., PRO-7000S).

Example 1

In 5 mass % solution of polylactic acid (number average molecular weight 72,000, melting point 164° C.) in chloroform, magnesium phenylphosphonate synthesized in Synthetic Example 1 was added in an amount of 1 mass % based on the amount of polylactic acid, and dispersed homogeneously. Then, from the resulting solution, chloroform was vaporized at 50° C. on a petri dish to obtain a sample in a form of film. The sample was cut into small pieces, the temperature was raised to 200° C. at 10° C./min., and kept at the status for 5 minutes, and then DSC measurement (manufactured by Seiko Instruments Inc., DSC-200) was carried out by cooling at 2° C./min. A calorific value ΔH was determined from the area of calorific peak arising from crystallization of polylactic acid observed on cooling, and crystallization temperature $T_c$ was determined from the temperature of calorific peak apex. DSC measurement data is shown in FIG. 1, and the results are shown in Table 1. Examples according to the present invention showed an increased calorific value accompanied with crystallization and an elevated crystallization temperature compared with Comparative Examples. Therefore, it is concluded that the composition of the present invention has an increased crystallization rate.

Example 2

The procedures were carried out similarly to Example 1 except that sodium phenylphosphonate synthesized in Synthetic Example 2 was used instead of magnesium phenylphosphonate synthesized in Synthetic Example 1. The results are shown in Table 1.

Example 3

The procedures were carried out similarly to Example 1 except that zinc phenylphosphonate synthesized in Synthetic Example 3 was used instead of magnesium phenylphosphonate synthesized in Synthetic Example 1. The results are shown in Table 1.

Example 4

The procedures were carried out similarly to Example 1 except that disodium 4-t-butylphenylphosphonate synthesized in Synthetic Example 4 was used instead of magnesium phenylphosphonate synthesized in Synthetic Example 1. The results are shown in Table 1.

Example 5

The procedures were carried out similarly to Example 1 except that sodium diphenylphosphinate synthesized in Synthetic Example 5 was used instead of magnesium phenylphosphonate synthesized in Synthetic Example 1. The results are shown in Table 1.

Example 6

The procedures were carried out similarly to Example 1 except that zinc phenylphosphonate synthesized in Synthetic Example 6 was used instead of magnesium phenylphosphonate synthesized in Synthetic Example 1. The calorific value ΔH was 43.7 (J/g) and the crystallization temperature $T_c$ was 133° C.

Comparative Example 1

The procedures were carried out similarly to Example 1 except that magnesium phenylphosphonate synthesized in Synthetic Example 1 was not used. DSC measurement data is shown in FIG. 2. The results are shown in Table 1.

Comparative Example 2

The procedures were carried out similarly to Example 1 except that talc (average particle diameter 3.5 μm) was used instead of magnesium phenylphosphonate synthesized in Synthetic Example 1. The results are shown in Table 1.

TABLE 1

| | Crystal Nucleator | ΔH (J/g) | $T_c$ (° C.) |
|---|---|---|---|
| Example 1 | Magnesium phenylphosphonate | 41.6 | 128 |
| Example 2 | Sodium phenylphosphonate | 40.3 | 122 |
| Example 3 | Zinc phenylphosphonate | 42.1 | 131 |
| Example 4 | Disodium 4-t-butylphenylphosphonate | 42.2 | 128 |
| Example 5 | Sodium diphenylphosphinate | 37.7 | 113 |
| Comparative Example 1 | None | No peak | No peak |
| Comparative Example 2 | Talc | 33.9 | 112 |

The addition of the metal salt of specific phosphorus compound as a crystal nucleator in a polylactic acid resin makes possible to improve the crystallization rate of the polylactic acid resin and to provide a polylactic acid resin composition excellent in heat resistance and forming processability.

Figure 1:
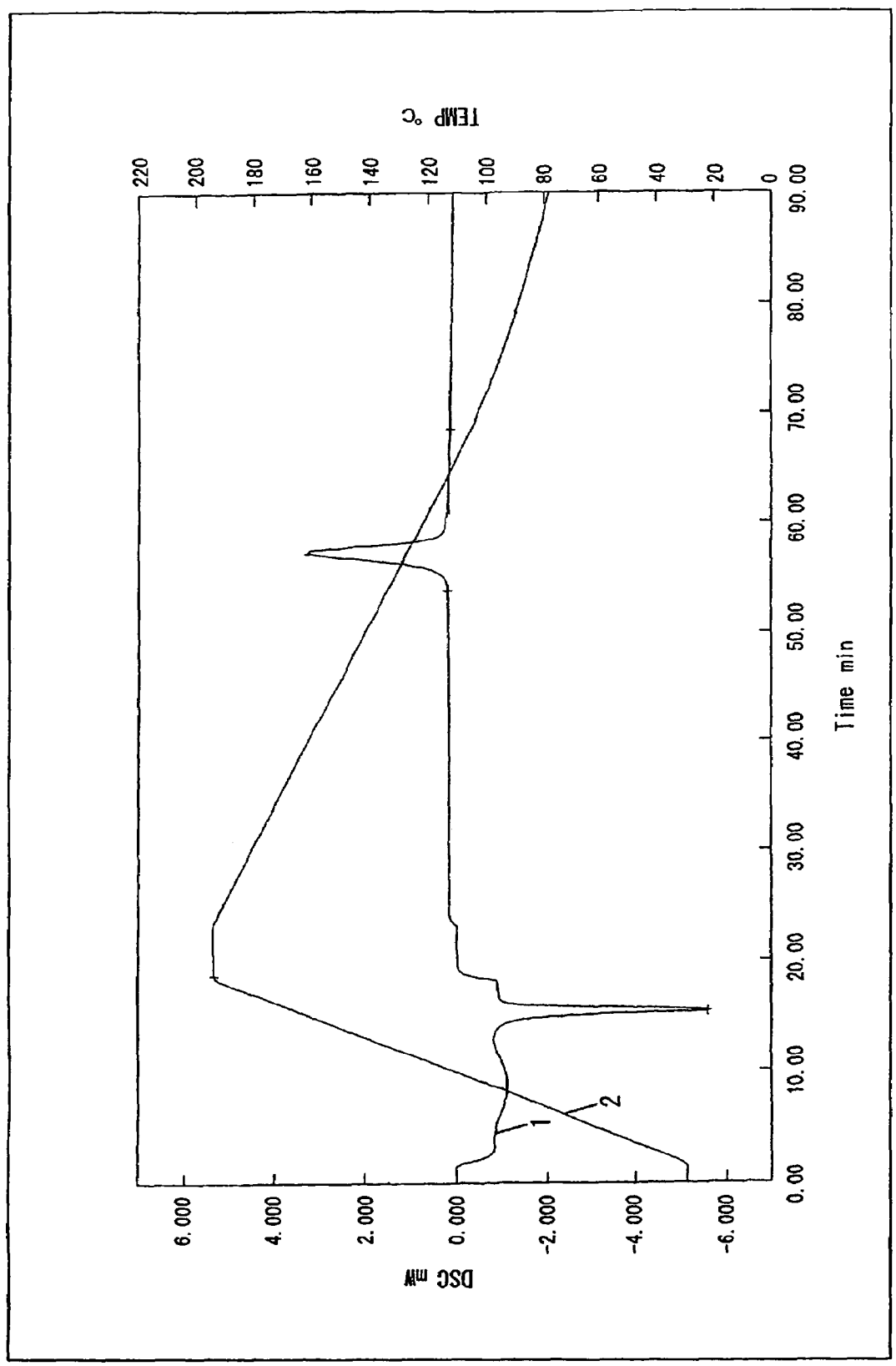
FIG. 1 is DSC measurement data of Example 1. DSC [Differential scanning calorie] (mW) and TEMP [temperature] (° C.) are shown on the ordinate, and time [Time] (min) is shown on the abscissa. In addition, 1 shows differential scanning calorie curve (DSC vs. Time), and 2 shows temperature curve (TEMP vs. Time).
Figure 2:
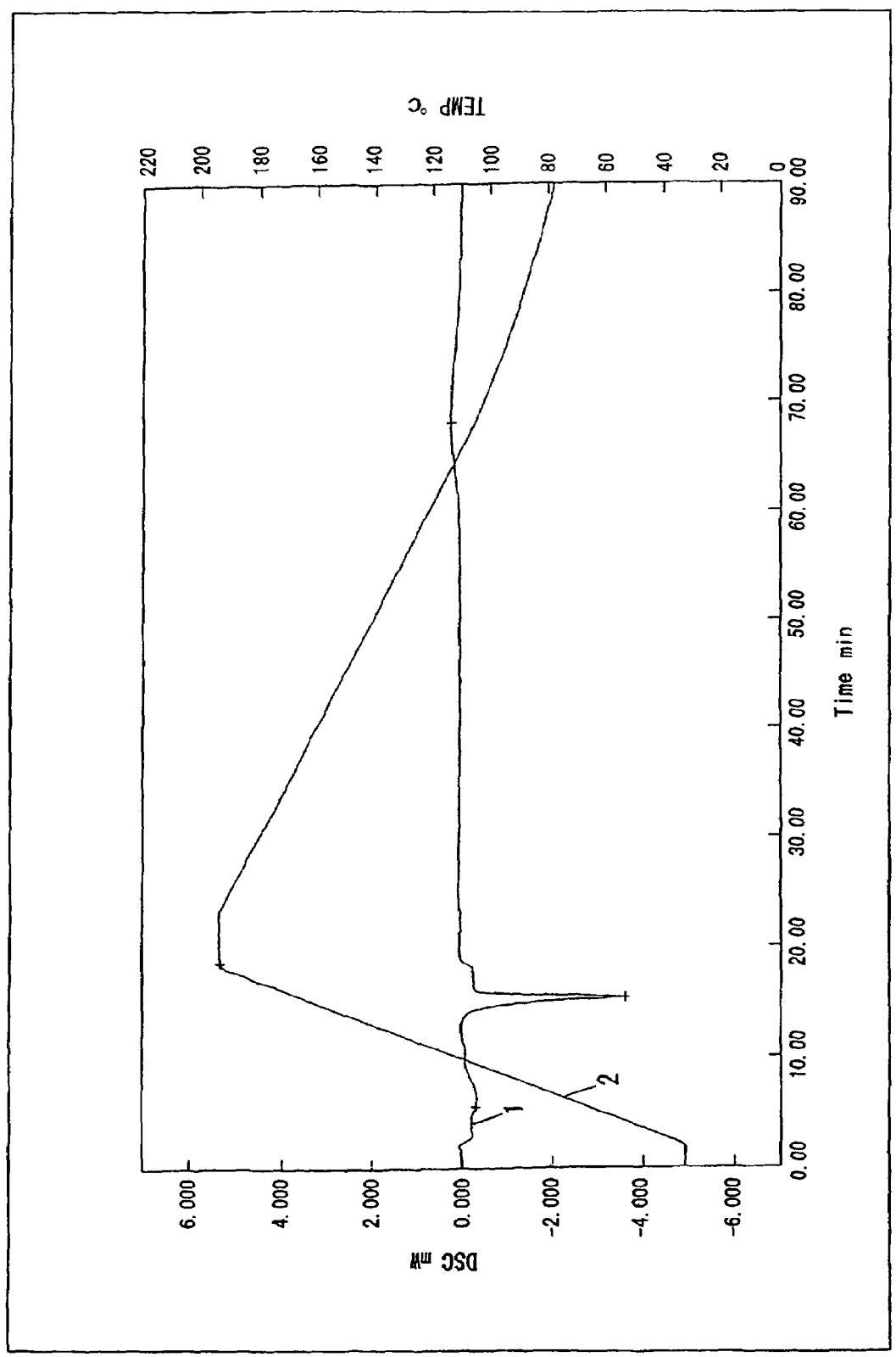
FIG. 2 is DSC measurement data of Comparative Example 1. DSC [Differential scanning calorie] (mW) and TEMP [temperature] (° C.) are shown on the ordinate, and time [Time] (min) is shown on the abscissa. In addition, 1 shows differential scanning calorie curve (DSC vs. Time), and 2 shows temperature curve (TEMP vs. Time).

What is claimed is:

1. A polylactic acid resin composition comprising a polylactic acid resin, and a metal salt of a phosphorus compound of formula (I)

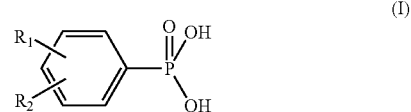

wherein
$R_1$ and $R_2$ may be the same or different and are hydrogen atom, $C_{1-10}$alkyl or $C_{2-10}$alkoxycarbonyl, and the average particle diameter of the metal salt is 0.05 to 10 μm.

2. The polylactic acid resin composition according to claim 1, wherein the metal salt is one or more selected from the group consisting of lithium salt, sodium salt, potassium salt, calcium salt, magnesium salt and zinc salt.

3. The polylactic acid resin composition according to claim 1, wherein the metal salt of the phosphorus compound of formula (I) is contained in an amount of 0.01 to 10.0 mass parts based on 100 mass parts of the polylactic acid resin.

4. A polylactic acid resin composition comprising a polylactic acid resin, and a metal salt of a phosphorus compound of formula (II)

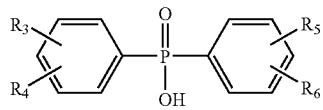
(II)

wherein $R_3$, $R_4$, $R_5$ and $R_6$ may be the same or different and are hydrogen atom, $C_{1-10}$alkyl or $C_{2-10}$alkoxycarbonyl, and the average particle diameter size of the metal salt is 0.05 to 10 μm.

5. The polylactic acid resin composition according to claim 4, wherein the metal salt is one or more selected from the group consisting of lithium salt, sodium salt, potassium salt, calcium salt, magnesium salt and zinc salt.

6. The polylactic acid resin composition according to claim 4, wherein the metal salt of the phosphorus compound of formula (II) is contained in an amount of 0.01 to 10.0 mass parts based on 100 mass parts of the polylactic acid resin.

7. The polylactic acid resin composition according to claim 1, wherein the metal salt of the phosphorus compound is one or more of phenyl phosphonate selected from the group consisting of lithium salt, sodium salt, potassium salt, calcium salt, magnesium salt, and zinc salt.

8. The polylactic acid resin composition according to claim 1, wherein the metal salt of the phosphorus compound is zinc phenyl phosophonate.

9. A process for producing a metal salt of a phosphorus compound of formula (I)

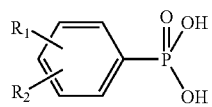
(I)

used in a polylactic acid resin composition, wherein $R_1$ and $R_2$ may be the same or different and are hydrogen atom, $C_{1-10}$alkyl or $C_{2-10}$alkoxycarbonyl, the method, comprising:

mixing a phosphorus compound and an oxide, a hydroxide or an organic acid salt of a metal in water or an organic solvent,
reacting the phosphorus compound and the oxide, hydroxide, or organic acid salt of a metal,
filtering or distilling off water or the organic solvent,
drying the salt as a crystalline powder, and
mixing the salt with shear force;
wherein the average particle diameter of the metal salt is 0.05 to 10 μm.

10. The process of claim 9, wherein:
the metal salt is zinc phenyl phosphonate,
the phosphorus compound is phenyl phosphonic acid,
the oxide is zinc oxide, and
the mixing is in water.

11. A crystal nucleator for a polylactic acid resin composition, comprising a zinc salt of a phosphorus compound of formula (I)

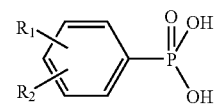
(I)

wherein:
$R_1$ and $R_2$ may be the same or different and each represent a hydrogen atom, a $C_{1-10}$alkyl group, or a $C_{2-10}$alkoxycarbonyl group; and
the zinc salt has an average particle diameter of 0.05 to 10 μm.

12. A process for producing a crystal nucleator for a polylactic acid resin composition, the method comprising:
mixing a phosphorus compound and zinc oxide in water,
reacting the phosphorus compound and zinc oxide,
filtering off the water,
drying the salt as a crystalline powder, and
mixing the salt with shear force;
wherein:
the crystal nucleator obtained comprises a zinc salt of a phosphorus compound of formula (I):

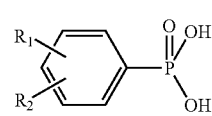
(I)

wherein:
$R_1$ and $R_2$ may be the same or different and each represent a hydrogen atom, a $C_{1-10}$alkyl group, or a $C_{2-10}$alkoxycarbonyl group; and
the zinc salt has an average particle diameter of 0.05 to 10 μm.

* * * * *

UNITED STATES PATENT AND TRADEMARK OFFICE
CERTIFICATE OF CORRECTION

PATENT NO. : 7,531,585 B2  Page 1 of 1
APPLICATION NO. : 10/593626
DATED : May 12, 2009
INVENTOR(S) : Masaaki Ozawa et al.

It is certified that error appears in the above-identified patent and that said Letters Patent is hereby corrected as shown below:

Title page,
Replace Item (54), to read as follows:
--(54) POLYLACTIC ACID RESIN COMPOSITION--.

Column 1, line 1, "POLYACTIC" should read --POLYLACTIC--.

Signed and Sealed this

Twenty-first Day of July, 2009

JOHN DOLL
*Acting Director of the United States Patent and Trademark Office*